P. KESTNER.
APPARATUS FOR CLEANING AIR OR GAS FILTERS.
APPLICATION FILED NOV. 10, 1908.
996,860.
Patented July 4, 1911.
2 SHEETS—SHEET 1.
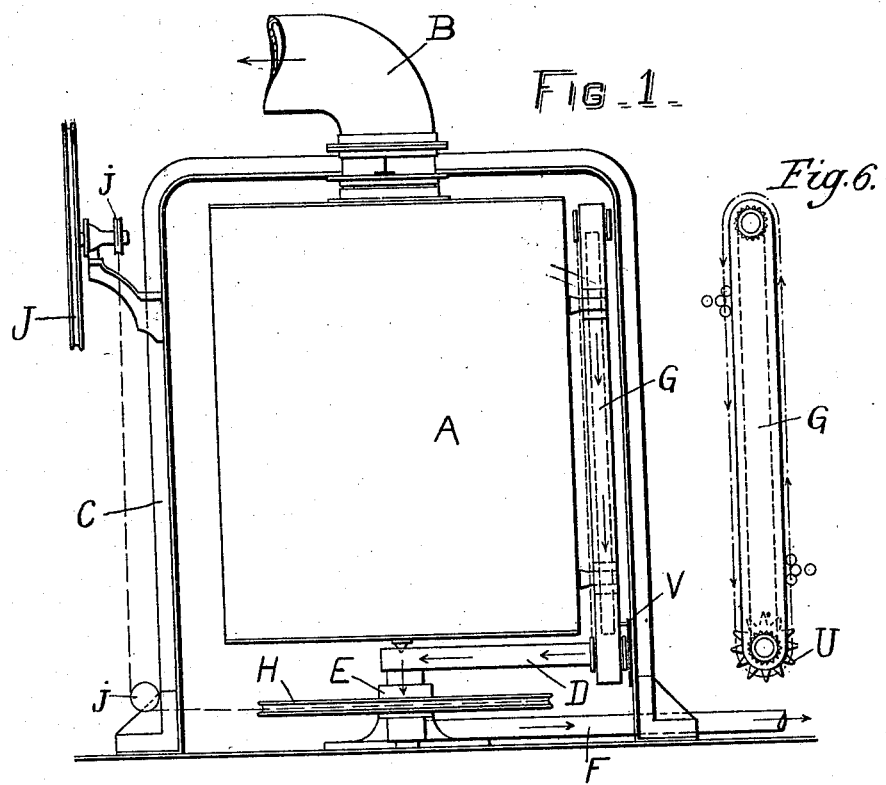
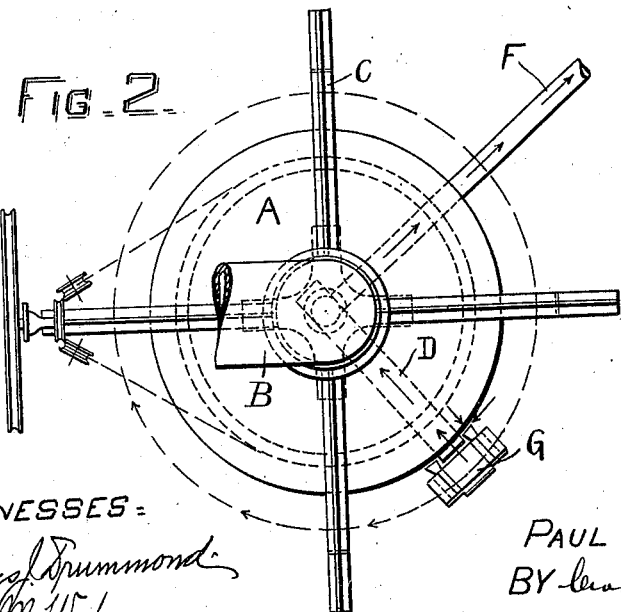
WITNESSES:
Thomas J. Drummond
Joseph M. Ward
INVENTOR:
PAUL KESTNER,
BY Crosby Gregory
ATTY'S.

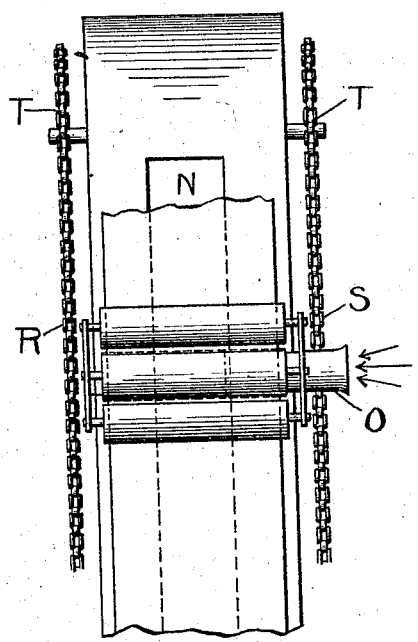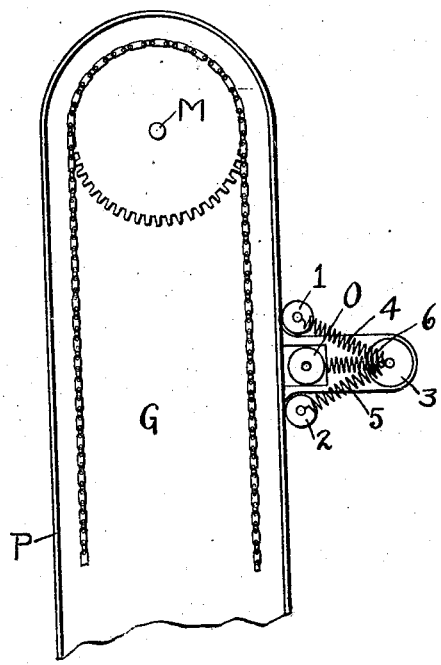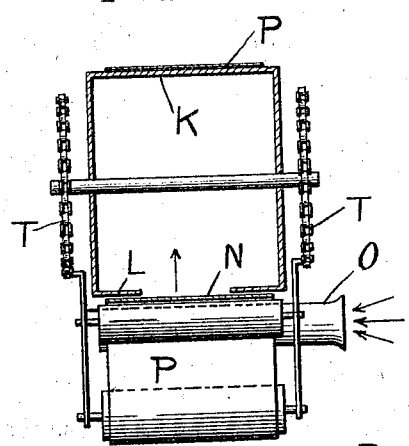

UNITED STATES PATENT OFFICE.

PAUL KESTNER, OF LILLE, FRANCE.

APPARATUS FOR CLEANING AIR OR GAS FILTERS.

996,860.   Specification of Letters Patent.   Patented July 4, 1911.

Original application filed February 4, 1907, Serial No. 355,587. Divided and this application filed November 10, 1908. Serial No. 461,992.

*To all whom it may concern:*

Be it known that I, PAUL KESTNER, a citizen of the French Republic, residing at Lille, in the Nord Province of France, have invented a new and useful Apparatus for Cleaning Air or Gas Filters, of which the following is a specification.

This invention has reference to an apparatus for cleaning air and gas filters wherein the air or gas is forced or caused to pass through a suitable fabric, such as flannellet or other porous filtering material, and the present application is a division of my application Serial No. 355,587, filed 4th February 1907.

In practice the filtering material, after having been in use for a greater or less period of time, becomes coated with the impurities deposited thereon by the air or gas as it passes therethrough, the coating causing the interstices in the filtering material to be choked up thereby either reducing the quantity of air which will pass through in a given period of time or requiring an increase of pressure, until at last the filter must be put out of use to enable the filtering material to be cleaned.

Unless a spare filter is at hand which can be used while the first one is being cleaned, the supply of filtered air or gas is of course cut off during such period of cleaning the material which may be a great inconvenience, but, if, on the other hand, a spare filter is provided to be used to avoid such inconvenience, not only is the original cost as least doubled but the space required to contain the filters is also doubled.

My invention consists in improved filter-cleaning apparatus of the type in which a pneumatic suction device is provided for cleaning the filtering screen while the filtering operation is proceeding, the object of the invention being to economize suction power while insuring thorough cleaning of the filtering surface and obviating choking of the suction nozzle.

In the known apparatus, a suction nozzle with a long narrow intake extends across the screen from side to side and the screen or the nozzle is moved to bring a fresh strip of the filtering surface under the said intake. If the intake be very narrow it is liable to become choked, and if it be wide enough to avoid choking the suction power required for even a comparatively small screen is very considerable and renders the cleaning operation expensive. The defects indicated are obviated in apparatus constructed in accordance with my invention, the nozzles employed being ordinary circular nozzles of approximately the same diameter as the suction pipe, and consequently not liable to become choked, and having two motions imparted to them to enable them to travel over the whole of the filtering surface while acting with their full force on a small area at a time.

In order that my invention may be readily understood I have appended drawings hereto to illustrate a simple form of apparatus whereby my said invention may be carried into practice.

In the said drawings:—Figures 1 and 2 are a side elevation and plan view respectively of my apparatus applied to a vertically arranged drum filter. Figs. 3, 4 and 5 are enlarged views of details to be referred to, and Fig. 6 is a view at right angles to that shown in Fig. 1 of the tube G and star-wheel V.

In these drawings A indicates a circular drum made of perforated metal or of wire gauze or lattice which is covered on its outer periphery with flannellet or other suitable material adapted to be used for filtering air or gas. The said drum is fixedly held in a vertical position by a suitable frame C and is provided with an outlet B which outlet leads to or has within it an exhauster—not shown—of any known suitable construction by means of which air or gas is drawn through the flannellet or other material whereby said air or gas is filtered and rendered clean and free from dust.

For the purpose of cleaning the filtering material I provide the following:—Immediately below the center of the filter drum A I support a horizontally rotatable hollow socket E which carries a horizontal tube D of a length so that its free end projects a suitable distance beyond the plane of the periphery of the drum, and at its free end I provide said tube D with a vertical tube G of preferably the shape shown, which tube is held near to and parallel with the filtering surface. By rotating the socket E the tube G will be carried around the circular filter.

For imparting the necessary rotary motion to the socket E I provide the frame C at a suitable part of the pulley J—to which rotary motion is imparted from any suitable source—and on said socket I provide a pulley H, a cord or equivalent—guided by rollers j if and as required—passing around both said pulleys. The socket E is in communication with an exhaust pipe F which latter leads to any known suitable exhauster (not shown).

I form one side L of the tube G with a slot N and passing completely around said tube in its vertical direction I provide a belt P which serves to close the slot N and to the outer face of said belt I attach a suction or exhaust nozzle O whose free end reaches into contact with the outer face of the flannellet or other filtering material. At the point where the nozzle is fixed to the belt P I form said belt with a slot or aperture the arrangement being such that when a suction or exhausting effect is produced in the pipe F air or gas will be drawn from the interior of the drum A through the filtering material which air or gas then passes through the nozzle O and slot N into the tube G and from the latter through the pipe D and socket E into the exhaust pipe F. In its passage through the filtering material the air or gas will carry with it any dust or other impurities deposited on the outer surface of such material so that the part thus acted on will have been cleaned without the action of the filter having been interfered with so far as the whole of the rest of the surface is concerned. At the same time as this cleaning operation is being effected, the tube G is rotating comparatively slowly around the drum in the manner and by the means already described so that the surface which is being cleaned is constantly changing.

When the tube G has rotated once completely around the drum it is necessary to change the vertical position of the exhaust nozzle so that a lower strip of the filtering material will on the next rotation of the tube G be cleaned. For this purpose I provide means such as a toothed or star wheel U which is rotated through the distance of one tooth at each rotation of the tube G by coming in contact with a stop V on a fixed part of the frame the belt P being so connected to the star wheel that it will be moved slightly around the tube G. If desired two or more stops V may be provided so that the belt P and with it the exhaust nozzle O will be moved twice or more frequently for each revolution of the tube G.

It will be noticed that in the arrangement hereinbefore described the belt P serves not only to close the slot N (so that air or gas can be drawn only through the exhaust nozzle into the tube G) and to carry the nozzle but also to move it in a vertical direction as required.

If desired two or more exhaust nozzles O may be provided so that so soon as or even before one of the nozzles has reached the bottom or one end of the drum A another nozzle will already have been brought into operative position at the top or at the other end of the drum. When one of the nozzles has reached say the bottom of the tube G it will be carried around the half-round end of the latter and will then be carried up the other side K thereof but as the latter is not formed with a slot no air or gas can be drawn through said nozzle until it has been carried over the top end of the tube G and into communication with the slot N on the other side L of said tube.

Instead of employing the belt P to carry around the exhaust nozzles I may utilize the belt for the purpose only of closing the slot N excepting so far as communication must be open between the exhaust nozzle and the tube G. An arrangement of this kind is shown in Figs. 3, 4 and 5. The nozzle O is slidable on the face of the tube G and is carried by a traveler which is provided with three rollers 1, 2 and 3 and the belt P is passed around these so that the traveler can be moved up and down on the tube G without the belt sliding on said tube. The rollers are provided with springs 4 and 5 which tend to push the rollers 3 outward and thus keep the belt taut and I also provide a spring 6 whereby the carrier and nozzle will be held in close contact with the tube.

The requisite motion is imparted to the carrier by chains R and S which pass over toothed wheels T and which are removed by a star wheel U coming in contact with a stop or stops V as already described.

The apparatus and means I have described for imparting motion to the exhaust nozzles are intended only for the purpose of illustrating a practical manner in which my invention may be carried into effect and I wish it to be understood that I do not intend thereby to limit myself to that particular construction.

What I claim as my invention and desire to secure by Letters Patent is:—

1. The combination with a fixed drum-shaped filter for filtering air or gas by drawing same through a filtering fabric mounted on the periphery of the drum, of a hollow socket mounted exteriorly of the drum and rotatable on the axis thereof and in communication with an exhauster, a tube extending radially from the said socket beyond the periphery of the said drum, a slotted tube mounted on the end of the said radial tube and extending across the periphery of the drum, means for rotating the said hollow socket together with the said radial tube and slotted tube, a belt mounted to slide longitudinally upon the said slotted tube, an aperture in the said belt, a suction nozzle mounted on the said belt over the said aperture, and means for automatically displacing the said belt and nozzle longitudinally upon the slotted tube.

2. The combination with a fixed drum-shaped filter for filtering air or gas by drawing same through a filtering fabric mounted on the periphery of the drum, of a hollow socket mounted exteriorly of the drum and rotatable on the axis thereof and in communication with an exhauster, a tube extending radially from the said socket beyond the periphery of the said drum, a slotted tube mounted on the end of the said radial tube and extending across the periphery of the drum, means for rotating the said hollow socket together with the said radial tube and slotted tube, an endless belt which embraces the said slotted tube longitudinally and passes over a nozzle carrier adapted to roll on the said belt, said nozzle carrier and means for automatically displacing same longitudinally of the slotted tube.

In testimony whereof I have signed my name to this specification in the presence of two subscribing witnesses.

PAUL KESTNER.

Witnesses:
HENRI CHARRIER,
LÉON PECKEL.